US008650108B1

(12) United States Patent
Schram et al.

(10) Patent No.: US 8,650,108 B1
(45) Date of Patent: *Feb. 11, 2014

(54) USER INTERFACE FOR INVESTMENT DECISIONING PROCESS MODEL

(75) Inventors: Dorene S. Schram, Chandler, AZ (US); Rena Lauren Murphy, Avondale, PA (US); Kathy L. Angell, Phoenix, AZ (US); Catharine Phillips Train, Norfolk, VA (US); Robert James McDonald, Chester (GB)

(73) Assignee: Bank of America Corporation, Charlotte, NC (US)

( * ) Notice: Subject to any disclaimer, the term of this patent is extended or adjusted under 35 U.S.C. 154(b) by 989 days.

This patent is subject to a terminal disclaimer.

(21) Appl. No.: 12/181,834

(22) Filed: Jul. 29, 2008

(51) Int. Cl.
*G06Q 40/00* (2012.01)
(52) U.S. Cl.
USPC ............... 705/36 R; 705/35; 705/36; 705/37; 705/38
(58) Field of Classification Search
USPC ................................ 705/36 R, 35, 36, 37, 38
See application file for complete search history.

(56) References Cited

U.S. PATENT DOCUMENTS

| | | | |
|---|---|---|---|
| 2003/0135442 A1* | 7/2003 | Kumar et al. | 705/37 |
| 2003/0149610 A1 | 8/2003 | Rowan et al. | |
| 2004/0083153 A1 | 4/2004 | Larsen et al. | |
| 2004/0172357 A1* | 9/2004 | Padgette | 705/38 |
| 2005/0119959 A1* | 6/2005 | Eder | 705/36 |
| 2006/0200395 A1* | 9/2006 | Masuyama et al. | 705/35 |
| 2006/0235783 A1* | 10/2006 | Ryles et al. | 705/35 |
| 2007/0100724 A1* | 5/2007 | Hollas et al. | 705/36 R |
| 2008/0021750 A1 | 1/2008 | Masuyama et al. | |
| 2008/0140583 A1* | 6/2008 | Lai et al. | 705/36 R |

* cited by examiner

*Primary Examiner* — Charles Kyle
*Assistant Examiner* — Siegfried E Chencinski
(74) *Attorney, Agent, or Firm* — Banner & Witcoff, Ltd.; Michael A. Springs

(57) ABSTRACT

Systems and methods for prioritizing multiple funding requests within an enterprise are provided. Aspects of the invention may be used in enterprises where separate departments or groups within the enterprise have differing goals. It often is beneficial to ensure that funded projects within the various departments do not deviate from the enterprise's core goals, such that the enterprise suffers from profit erosion and/or an undue risk. In one aspect, novel methods provide a segment score to prioritize different projects in the context of the enterprise's risk, strategy, and finance goals. In another aspect, a computer-readable medium may be used to execute computer-readable instructions for prioritizing multiple projects in view of the enterprise's goals.

20 Claims, 7 Drawing Sheets

Fig. 5

| | Element | | Scoring/Definition |
|---|---|---|---|
| 1 | Contractual Risk – the project *mitigates* contractual risk; The deployment of this project reduces or eliminates negative impact to BAC due to a binding agreement made with another party (typically a vendor or client/customer). Examples; Fair Isaacs, VISA/MC, TSYS, etc. Impact is considered to be by account population being addressed by the project. | 0.30 512 | 522 { A = 0% of account population<br>B = 1 – 24% of account population<br>C = 25 – 49% of account population<br>D = 50 – 74% of account population<br>E = 75 – 100% of account population |
| 2 | Brand Image and Reputational Risk – the project *mitigates* brand image and/or reputational risk; The deployment of this project reduces or eliminates negative impact to BAC brand image (consider privacy and/or information protection Implications) or the risk from negative customer experience or perception of the impact to the corporation's reputation in the marketplace. | 0.25 514 | 524 { A = Local Impact<br>B = Regional Impact<br>C = National Impact<br>D = Multi National Impact<br>E = Global Impact |
| 3 | Legal Risk – the project *mitigates* legal risk defined as; The risk from existing or impending lawsuits as a result of actions (or non action). Also considers legal action taken to a competitor. Risk level determined by impact to geography or population. | 0.20 516 | 526 { A = Local Impact (city, town, country) and/or 0% of account population<br>B = Regional Impact (2 or more states or provinces but less than 5) and/or 1 – 24% of population<br>C = National Impact – (1 nation) and/or 25-49% of population<br>D = Multi National Impact (2 or more nations but less than 5) and/or 50 – 74% of population<br>E = Global Impact (impact has global potential) and/or 75 – 100% of population |
| 4 | External Regulatory/Compliance Risk – the project *mitigates* compliance risk defined as; The risk from violating or not complying with laws, prudent fiduciary practices, and ethical standards. This risk exposes the corporation to payment of fines, penalties, compensatory and punitive damages and legal fees. Determine the propensity for risk using definitions (US Card can refer to regulatory heat map for identified propensity). | 0.15 518 | 528 { A = Project does not mitigate an external regulatory or compliance risk<br>B = Low Nature and extent of business carries potential for violations.<br>Violations for non-compliance could result in moderate fines.<br>C = Medium Increased complexity of the regulatory requirements for the business subjects the company to a greater potential for regulatory action, such as fines, penalties and litigation.<br>D = High Regulations are complex or contradictory. Violations could result in significant financial, reputational and/or business loss. Business is subject to a rapidly changing regulatory environment. |
| 5 | Operational & Process Execution Risk – the project *mitigates* operational or process execution risk defined as; The risk arising from products and services or changes not being documented, processed, and/or executed effectively or efficiently. Process risk also includes the risk associated with the failure to record and report financial and management information in a complete, accurate and timely manner. Impact is considered by business line engagement. Also addresses risk resulting from inadequate or failed internal processes, people and systems or from external events. | 0.10 516 | 530 { A = Project does not mitigate operational or process risk.<br>B = Credit/Debit Card impact only<br>C = 2 or more businesses impacted but not GCSBB entirety<br>D = GCSBB impacts in entirety<br>E = Enterprise wide impacts |

600

Element

602 — 1  Sustaining
Typical recurring year over year activities to maintain current operational methodology and processes. Viewed as how we run the business. (Keep doors open) Not typically risk or compliance related. Sustains a "good practice" previously established by business.

604 — 2  Cost Saves
An effort reducing the cost for a current operation or process by creating efficiencies in manual or systemic activities.
Loss Avoidance = anticipation of experiencing loss due to an assumption of a future event (fraud, VISA in Canada, etc)
Cost Reduction = reducing costs that are already booked to plan/annual budget
Cost avoidance = assumption that a cost will happen at some future point (FTE) if project is not deployed

606 — 3  Competitive Advantage
Development of expanding markets/products to maintain or improve our position in the competitive landscape. A reputational or Competitive play. Typically a non-revenue effort.
What category(s) does the project promote?
1 Product/Process helps to expand geographical market
2 Product/Process first in market or matches a product offered by a competitor
3 Product/Process increases favorable Reputation

608 — 4  Infrastructure
Support, enablement or provision of existing processes or environment to those areas not at current foundational standards. (Platform or operational enhancements included.)
*Discretionary enhancements.*
What types of existing gap does this effort address?
1 Customer or Associate Experience
2 Operational Efficiency or Productivity Improvement
3 Remediation – as effort to avoid future break/fix potential
4 Expand Service Capability (example; adding tool to desktop improving quality of service)

610 — 5  ROC (Revenue, Opportunities and Cost Savings)
A tactical solution and strategy *directly* aligned to a 5-year ROC
Which one of the following concepts does the project most strongly correlate with?
A Conflict with ROC – initiative is not aligned with stated strategic direction. (Investment in declining tech – sunsetting system).
B No direct alignment or alignment not clear.
C Interdependency to ROC. Not a direct alignment. Consistent with strategy but not a required enabler. Effort concurrent with a complimentary effort to create additional or I ncremental benefit.
D Provision/Enabler to a directly aligned effort. Strong consistency with strategic direction.
E Aligned to primary ROC category (1-7) Clear line of sight to business initiative.

612 — 6  Strategy - Technology
1 TCOA (Total Cost of Application) Reduction
2 Complexity Reduction
3 Key Strategic Platform Development
4 Enterprise Initiative Delivery (EID) Impact

Fig. 6

Legend (735)

| | |
|---|---|
| 9 | Row much more important than column |
| 3 | Row somewhat more important than column |
| 1 | Row same importance as column |
| 0.3333 | Column somewhat more important than row |
| 0.111 | Column much more important than row |

Fill in white spaces

| | Sustaining 714 | Cost Saves 716 | Competitive Advantage 718 | ROC 720 | Infrastructure 722 | Technology Strategy 724 |
|---|---|---|---|---|---|---|
| Sustaining 702 | | 9 | 9 | 3 | 9 | 3 |
| Cost Saves 704 | 0.1111 | | 0.3333 | 0.1111 | 1 | 0.3333 |
| Competitive Advantage 706 | 0.1111 | 3 | | 0.3333 | 3 | 1 |
| ROC 708 | 0.3333 | 9 | 3 | | 9 | 3 |
| Infrastructure 710 | 0.1111 | 1 | 0.3333 | 0.1111 | | 0.1111 |
| Technology Strategy 712 | 0.3333 | 3 | 1 | 0.3333 | 9 | |
| Sum | 1 | 25 | 13.667 | 3.8889 | 31 | 7.4444 |

| | Sustaining | Cost Saves | Competitive Advantage | ROC | Infrastructure | Technology Strategy | SUM 742 |
|---|---|---|---|---|---|---|---|
| Sustaining 740 | 0 | 0.36 | 0.6585 | 0.7714 | 0.2903 | 0.403 | 2.4832728 |
| Cost Saves | 0.1111 | 0 | 0.0244 | 0.0285 | 0.0323 | 0.0448 | 0.241107 |
| Competitive Advantage | 0.1111 | 0.12 | 0 | 0.0857 | 0.0968 | 0.1343 | 0.5479279 |
| ROC | 0.3333 | 0.36 | 0.2195 | 0 | 0.2903 | 0.403 | 1.6061532 |
| Infrastructure | 0.1111 | 0.04 | 0.0244 | 0.0285 | 0 | 0.0149 | 0.2189932 |
| Technology Strategy | 0.3333 | 0.12 | 0.0732 | 0.0857 | 0.2903 | 0 | 0.9025409 |

| RANK | |
|---|---|
| 1 | Sustaining |
| 5 | Cost Saves |
| 4 | Competitive Advantage |
| 2 | ROC |
| 6 | Infrastructure |
| 3 | Technology Strategy |

Fig. 7

USER INTERFACE FOR INVESTMENT DECISIONING PROCESS MODEL

FIELD OF THE INVENTION

The disclosure generally relates to systems and methods for prioritizing multiple funding requests and more particularly to systems and methods for ranking multiple funding requests in view of the financial, risk, and strategic goals of an enterprise.

BACKGROUND

Business enterprises are increasingly expanding into global markets. Globalization of the marketplace has resulted in the allocation of limited resources across several governmental, cultural, and geographic borders. Moreover, businesses are expanding their offerings of goods and services. As part of this expansion, the majority of businesses have established multiple operating divisions and groups, each that may have different goals. Indeed, some goods or services are highly profitable, however, carry substantial risk, while others are prone to less risk, but are not likely to produce large profits. Furthermore, determining which projects to fund among multiple divisions or subsidiaries of corporations that have large quantities of personnel becomes difficult. Therefore, in many instances it would be beneficial to the enterprise to ensure that funded projects within the various departments do not deviate from the company's core goals, such that the enterprise suffers from profit erosion and/or an undue risk.

Current processes of prioritizing funding requests are disjointed and often result in an ineffective use of resources, both in terms of currency and human resources. Additionally, each line of business may not be adequately represented or may have limited opportunities to present multiple requests. This results in each potential project being viewed independently rather than utilizing a more comprehensive approach that considers the portfolio of investments in view of the enterprise's core goals. In this regard, prioritization has been based primarily on high level financial metrics, with little consideration for the longer-term strategic value that a project could add. Known systems also suffer from not measuring factors that are qualitative in nature and/or are not equipped to consider the specific goals of the enterprise. Rather many current solutions utilize generic measurements that often force the enterprise to form to the generic system's goals, rather than the enterprise's own goals.

BRIEF SUMMARY

Aspects of the present disclosure address one or more of the issues mentioned above by disclosing methods, systems and computer readable mediums for prioritizing funding requests. The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

Processes and systems are disclosed for prioritizing funding requests. In one aspect, methods allow an enterprise to readily prioritize different competing funding requests. In one embodiment, a model having a finance segment, a strategy segment, and a risk segment is utilized where each segment of the model has elements relating to specific goals of an enterprise. Each element of a segment may be pair-wise matched compared to each other element. The method may include processes for assigning several quantifiable thresholds to each element of each segment. In one embodiment, the thresholds consider historical data of the enterprise. A value may be assigned to each of the thresholds for the elements. In one embodiment, a processor may calculate an element score for the elements by utilizing, at least in part, a quantifiable value for the quantity of thresholds exceeded as indicated by a received value and a prioritization value of the element as compared to the other elements in the segment.

Aspects of the invention may be provided in a computer-readable medium having computer-executable instructions to perform one or more of the process steps described herein. In one embodiment, computer-executable instructions may prioritize each element of each a finance segment, a strategy segment, and a risk segment of a model against each other element of the same segment according to a prioritization value, wherein each element relates to a specific goal of an enterprise. The instructions may assign multiple thresholds to each element of each segment, wherein the threshold considers historical data of the enterprise and further assign a quantifiable value to each of the thresholds for the elements. In certain embodiments, the instructions may further allow for the receipt of a user input indicative of the quantity of thresholds exceeded for the elements. In one embodiment, a processor may also calculate an element score for at least one element by utilizing, at least in part, the quantifiable value for the quantity of thresholds exceeded as indicated by the received value and the prioritization value of the element.

These and other aspects of the disclosure are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which:

FIG. 5 illustrates an exemplary implementation of thresholds according to one embodiment of the invention.

FIG. 6 shows an exemplary Listing of elements that may be used in a strategy segment according to one embodiment of the invention.

FIG. 7 shows an exemplary user interface that may be used in accordance with one embodiment of the invention.

DETAILED DESCRIPTION

The invention may be described in the general context of computer-executable instructions, such as program modules, being executed by a computer. Generally, program modules include routines, programs, objects, components, data structures, etc. that perform particular tasks or implement particular abstract data types. The features of the present application may be practiced either in a local computing device or in a distributed computing environment where tasks are performed by remote processing devices that are linked through a communications network. In a distributed computing environment, program modules may be located in both local and remote computer storage media including memory storage devices.

Illustrative Computing System Environment

Figure 1:
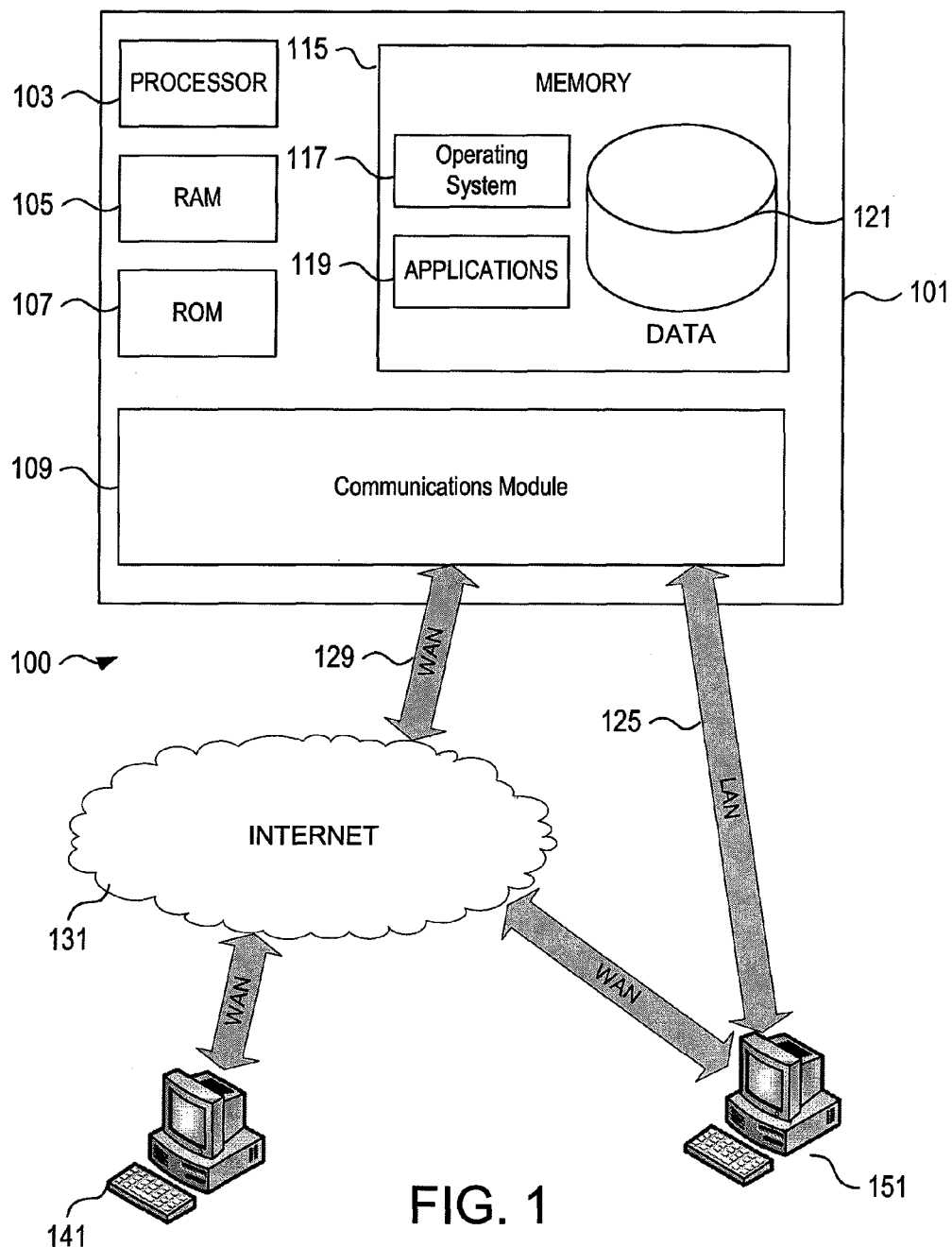
FIG. 1 shows an illustrative operating environment in which various aspects of the disclosure may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein, may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101. Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As described in detail below, the database 121 may provide centralized storage of goals, elements, thresholds, and/or scaling factors for the entire business, allowing interoperability between different elements of the business residing at different physical locations.

Computing device 101 may operate in a networked environment supporting connections to one or more remote computing devices, such as remote computing devices 141 and 151. The remote computing devices 141 and 151 may be personal computing devices or servers that include many or all of the elements described above relative to the computing device 101. One or more remote computing devices 141 and 151 may be used to send and/or receive information regarding a Decisioning Model (discussed in more detail below).

The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the computing device 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment of the invention, may include computer executable instructions for invoking user functionality related to communication including, for example, email, short message service (SMS), and voice input and speech recognition applications.

Illustrative Processes for Investment Decisioning

Figure 2:
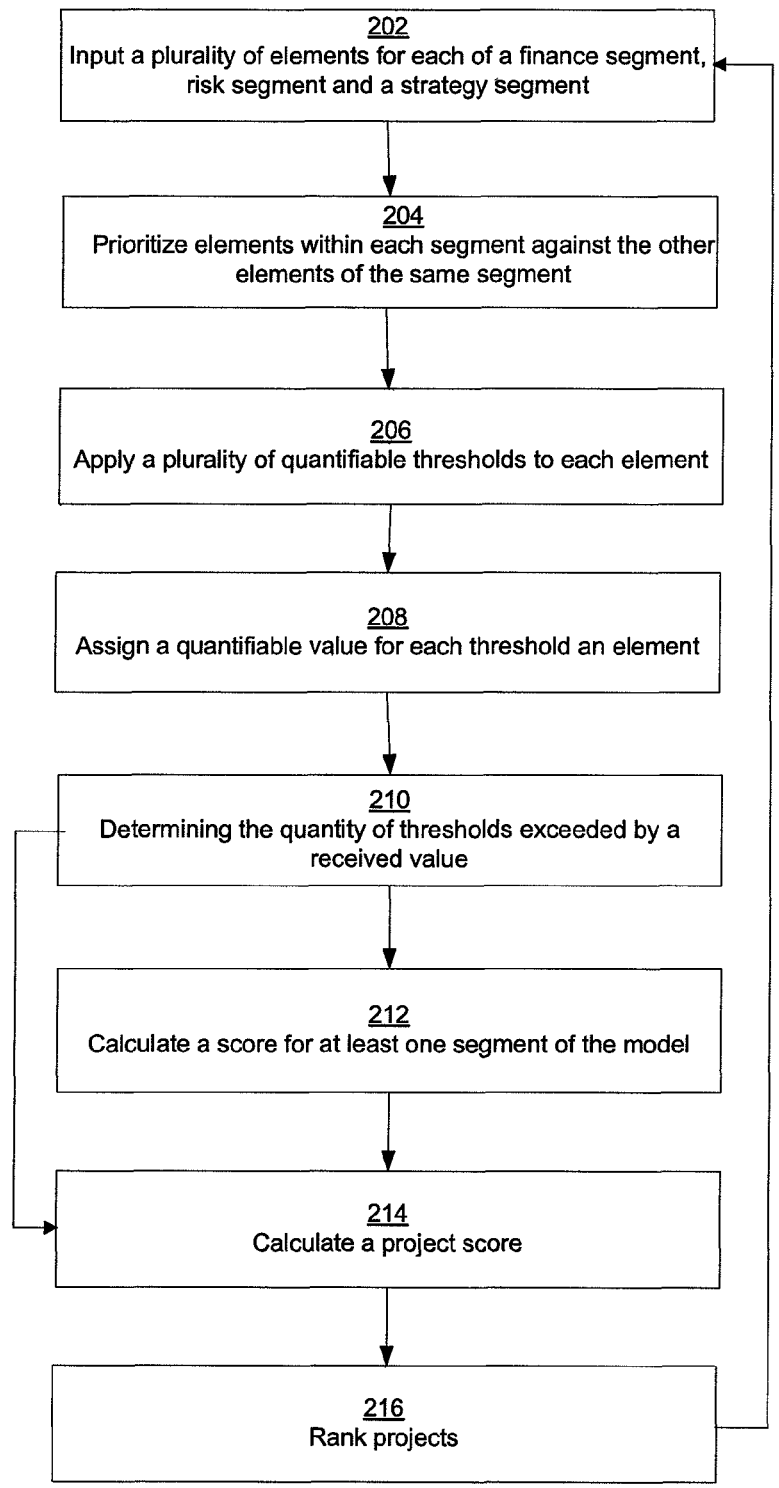
FIG. 2 is a flowchart demonstrating an exemplary method according to one embodiment of the invention.

FIG. 2 is a flowchart demonstrating an exemplary method according to one embodiment of the invention. As shown in FIG. 2, step 202 includes the input of a plurality of elements for each of a finance segment, risk segment and a strategy segment. Step 202 may be applied to models of an enterprise that includes one or more departments in one or more geographic locations. Indeed, in today's global market, the majority of businesses include different operating divisions and groups, each that may have different goals. For example, while some departments within an enterprise may strive to reduce costs and/or lower risks, while other departments may strive to increase revenue in order to obtain a requisite profit margin. Thus, different departments or groups within an enterprise naturally will have differing goals. Nonetheless, in many instances it would be beneficial to the enterprise to ensure that funded projects within the various departments do not deviate from the company's core goals, such that the enterprise suffers from profit erosion and/or an undue risk.

Furthermore, globalization of the marketplace has resulted in divisions or subsidiaries of corporations that have large quantities of personnel, often spread throughout different countries, such that managing the goals of the subsidiary or division becomes difficult. Therefore, step 202, and the teachings of various embodiments of the invention in general, may be applied to specific subsidiaries and/or divisions of an enterprise. For example, modern financial institutions often have several large divisions. The institutions may have divisions for banking, investing, and card services. Thus, according to select aspects of the invention, each division may be considered an "enterprise" in itself for purposes of this disclosure. Yet, in other embodiments of the invention, the collective grouping of various departments of a corporation is considered an "enterprise".

Figure 3:
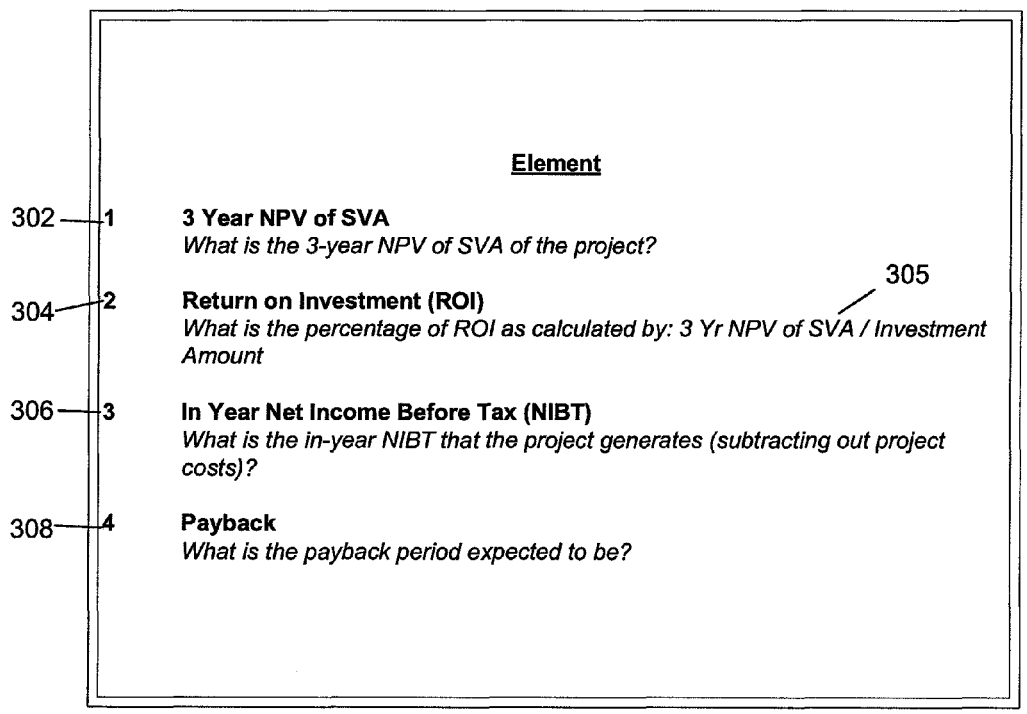
FIG. 3 shows exemplary elements that may be inputted in a financial segment of the model according to one embodiment of the invention.

FIG. 3 shows exemplary elements that may be inputted in the financial segment of the model at step 202 according to one embodiment of the invention. As seen in the Listing of elements 300, the elements (302-308) relate the financial goals of the enterprise. For example, exemplary element 302 relates to the net present value ("NPV") of shareholder value added ("SVA"). Specifically, element 302 requests the "3-year NPV of SVA of the project." Those skilled in the art will understand that such a specific element is merely shown for illustrative purposes and that other elements may consider different information, such as regarding a different timeframe of measurement.

As also seen in FIG. 3, one or more elements may be associated with information regarding that particular element. For example, element 304 requests information regarding the return on investment ("ROI") for a specific project proposed for the enterprise and is associated with Information 305, which relates to how the ROI is calculated. Specifically, information 305 indicates that the ROI is "calculated by: 3 YrNPV of SVA/Investment Amount." In one embodiment, the information is presented to a user (discussed in more detail below) so as to provide instructions on how to calculate an answer for the element. Yet in other embodiments, the information may merely be provided for informational purposes only and any calculations may be done automatically from prior data stored on a computer-readable medium.

The remaining two elements in listing 300 financial model relate to "In Year Net Income Before Tax (NIBT)" (element 306), and "Payback" (element 308). Those skilled in the art will appreciate that the Listing of elements 300 may comprise additional elements or fewer elements, depending on a myriad of factors, such as, for example: goals identified by the enterprise, the complexity of the goals, the intended complexity of the model, among other factors. In one embodiment, the number of elements corresponds to the number of goals. For example, if the enterprise determines that there are five important financial goals, then one embodiment of the invention may have five financial elements, where each element corresponds to a particular goal. Yet in another embodiment, multiple elements are directed towards a single goal. This may be advantageous in several instances, such as for example, where the goal is complex and requires multiple elements to ascertain the required information, or where the model is desired to require less complex information through multiple less-complex elements, and/or where multiple elements may be used as "back-up" to ensure the answers are consistent. In yet other embodiments, one or more elements may relate to multiple goals of the company.

Figure 4:
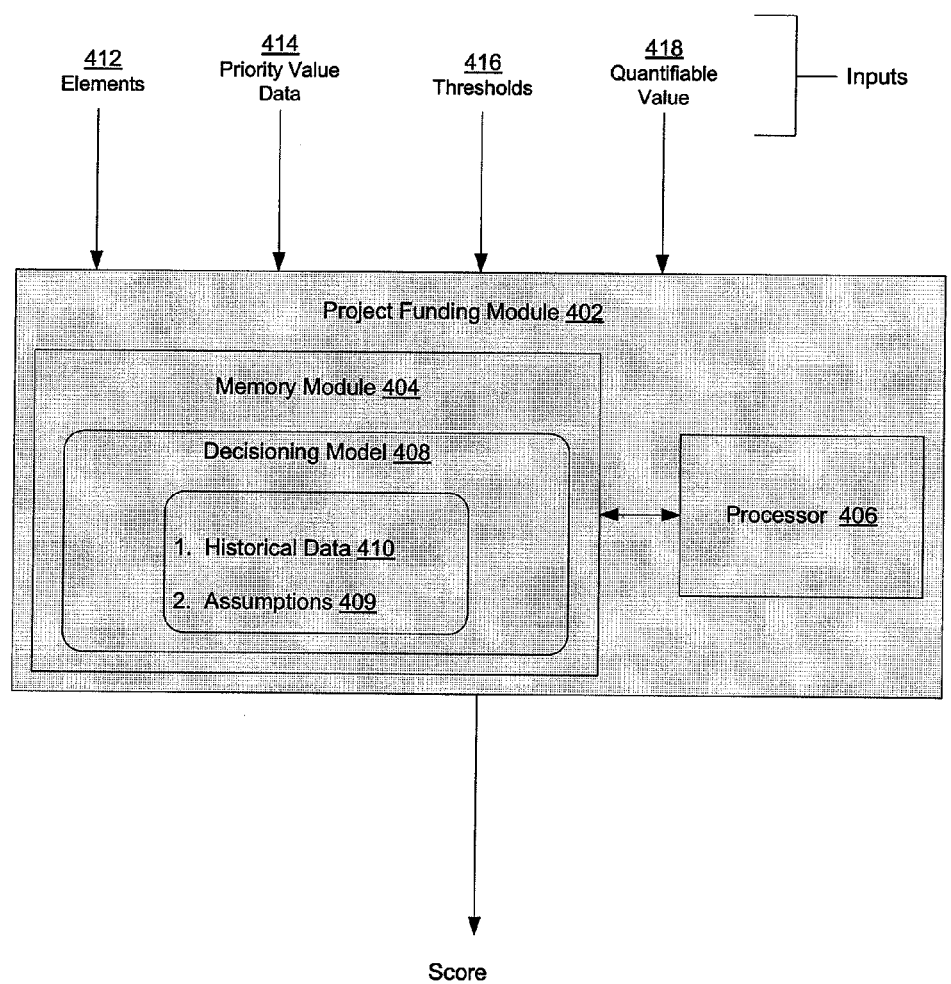
FIG. 4 illustrates an exemplary Project Funding Module according to one embodiment of the invention.

FIG. 4 illustrates a Project Funding module 402 that may receive the input of step 202 according to one embodiment of the invention. For example, Project Funding module 402 may be used to make an investment decision regarding multiple options for investment, in accordance with an embodiment of the invention. Project Funding module 402 may include a memory module 404 and a processor 406. Project Funding module 402 may be located at the enterprise, such as at a server or workstation or at any other location that may be accessed, such as through a Wide Area Network ("WAN"), for example, the Internet. Memory module 404 may be implemented with one or more physical or magnetic memory devices, such as a disk drive, magnetic memory, optical disk or other device used to store computer-executable instructions. In one embodiment, memory module 404 is implemented with a random access memory RAM of processor 406. In other embodiments, memory module 404 may be physically located at one or more locations. Indeed, in one embodiment, one or more computer-readable mediums of the memory module 404 may be located on one or more servers remotely located from the enterprise.

Memory module 404 includes a model used to evaluate potential projects or investments for funding. The Decisioning model 408 may be associated with Assumptions 409 or Historical Data 410. An exemplary model is described in detail below in relation to the illustrative method provided in FIG. 1.

As discussed above, elements for the each of the finance, strategy, and risk segments are inputted into the Project Funding module 402 (see input 412). In one embodiment, the elements may be stored on memory module 404, which may comprise RAM 105 or ROM 107. In certain implementations, utilizing the NIBT, 3 Year NPV of SVA, ROI and Payback elements, in conjunction with other aspects of the invention as discussed below, may provide satisfactory results for achieving the financial goals of an enterprise.

At step 204, each of the elements within each of the finance, risk and strategy segments are prioritized against the other elements of the same segment according to a prioritization value. The prioritization value is determined based upon the enterprise's goals. In one embodiment, where the prioritization value is already known and relatively static, Assumptions 409 may be accessed to determine the prioritization value. In another embodiment, however, the prioritization value may be calculated by utilizing data from Historical Data 410. Indeed, the Decisioning model 408 may access Historical Data 410 to determine if a set of initial goals has been met, and, if so, calculate different priority values, such as with processor 406, to best ensure that the goals are being realized. In yet another embodiment, input 414 may provide the priority value and/or data used by processor 406 to calculate the priority value. For example, as enterprises expand and/or acquire new subsidiaries, the enterprise's goals may need to be re-prioritized. Furthermore, external forces, such as the state of the economy, may impact the prioritization of the company's goals. Therefore, in certain embodiments, data from input 414 ("Priority Value Data") may be utilized to ensure the most recent prioritization is being fulfilled. Those skilled in the art will appreciate upon review of this disclosure that data from Assumptions 409, Historical Data 410, and/or Input 414 may be used in conjunction with each other to calculate the prioritization values.

FIG. 5 assists in explaining an exemplary implementation of calculating priority value according to one embodiment of the invention. Similar to Listing of elements 300, Listing of elements 500 corresponding to the enterprise's own goals. While Listing of elements 300 corresponds to financial goals of the enterprise, Listing of elements 500 corresponds to goals of an exemplary risk segment of the model 408. Specifically, as shown "Contractual Risk" 502 relates to the mitigation of risk for a specific funding request. The other elements shown in FIG. 5 are: Brand Image and Reputational Risk 504, Legal Risk 506, External Regulatory/Compliance Risk 508, and Operational & Process Execution Risk 510.

In one embodiment, an analytical hierarchy process ("AHP") is applied to the elements (502-510) to compare each element independently with every other element being considered within the Listing of elements 500. The inventors have found that in certain embodiments, using an AHP significantly limits the inherent subjective approach associated with such decisions and provides an acceptable qualitative approach. Those skilled in the art will appreciate that several AHP-like processes may be applied to the model without departing from the scope of the invention. Looking to FIG. 5, each element (502-510) is associated with a priority value (512-520). As seen, element 502, which relates to Contractual Risk, has the highest priority value (priority value 512 is "0.30") and element 510, which relates to Operational & Process Execution Risk, has been assigned the lowest priority value (priority value 520 has a value of "0.10").

As discussed above, the priority values may be stored on memory module 404, or any computer-readable medium. In one embodiment, the priority values 512-520 are stored within Assumptions 409. While a priority value is "applied" to each of the elements of each of the segment, there is no requirement that the priority value be re-calculated for each iteration, or even that the priority value changes for each iteration of the model 408. Indeed, in certain embodiments, the priority value for each element may be reused several iterations before being recalculated.

At step 206, a plurality of quantifiable thresholds are applied to each element of each segment of model 408. Unlike certain prior art systems, the thresholds consider enterprise-specific data. The thresholds may be tailored specific to each element of each segment. In one embodiment, the thresholds are calculated from historical data from the enterprise's own operations, such as from data stored in Historical Data 410 and/or Assumptions 409. Yet in other embodiments, long term goals specific to the enterprise may have an impact on the determination of the thresholds. Still in yet further embodiments, both long-term goals and historic performance levels are considered when determining thresholds. As explained in reference to FIG. 5, thresholds assist in the differentiation and scale of importance within a specific element. FIG. 5 illustrates an exemplary implementation of thresholds according to one embodiment of the invention showing an exemplary risk segment of model 408.

As discussed above, Listing of elements 500 consists of a plurality of elements (502-510). Each element (502-510) has a plurality of thresholds associated with that particular element. The thresholds may be quantitative, such as by being numerical in form, such as when representing currency or percentages. For example, using element 502 and associated plurality of thresholds 522 as an example, element 502 relates to "Contractual Risk" and the associated plurality of thresholds 522 each consist of discrete population percentages of an account population (see also, elements 504 and 506, which are associated with thresholds 524 and 526, respectively, that are numerical in form). While thresholds within the plurality of thresholds 522 are equally represent increments of 25% of the population, there is no requirement that each of the thresholds be quantitatively proportional. For example, there is no requirement that each threshold for a particular element represent the same quantity, rather in certain embodiments, each threshold may be logarithmically or exponentially related. In yet, other embodiments, there is no fixed relationship between the plurality of thresholds for a specific element.

The thresholds associated with an element may be more qualitative in nature, such as when the associated element request information that is more subjective in nature. For example, element 504 relates to "Brand Image and Reputational Risk" and is associated with plurality of thresholds 524, which are more subjective in nature than thresholds 522. Specifically, the plurality of thresholds 524 are labeled without numerical values. In one embodiment, the plurality of thresholds (such as thresholds 524 are calculated by considering data from Historical Data 410. Indeed, the model 408 may consider the Historical Data 410 to determine if a set of initial goals have been met, and if so, calculate different thresholds, such as with processor 406, to best ensure that the goals are being realized. For example, in an exemplary financial segment of model 408, data from Historical Data 410 may comprise past performance levels, which are utilized in calculating or updating thresholds for one or more elements. In a more specific example of an exemplary risk segment of the model 408, data from Historical Data 410 may be used to calculate or update the thresholds 416, for example relating to element 528, from ""Low," "Medium," and "High" to "Extremely Low," "Low," and "Medium." Furthermore, the number of thresholds associated with any element may be increased or decreased as data from Historical Data 410 or any other source is considered. Data stored on Memory module 404 may also be utilized when calculating or determining thresholds. In one embodiment, financial data, such as data from the financial segment of the model 408, is considered when calculating the thresholds. For example, if the scoring (explained in more detail below) of a segment (or an element of a segment) is above a certain value, the thresholds of another segment (or element of the segment) may be updated. In one such embodiment, if a project is determined to significantly mitigate risk, then thresholds for a specific element of the financial segment may be updated.

In yet another embodiment, input 416 may provide one or more thresholds and/or data used by processor 406 to calculate the thresholds. For example, as enterprises expand and/or acquire new subsidiaries, the enterprise's goals may need to be re-prioritized. Furthermore, external forces, such as the economic forces, may impact the prioritization of the company's goals. For example, a downturn in the economic environment may result in having to adjust the thresholds for elements in the risk, strategy, and/or financial segments. Therefore, in certain embodiments, data, such as from input 416, may be utilized to determine or calculate thresholds. In another embodiment, thresholds in the financial segment may be determined or otherwise derived from the historical project portfolio of similar projects. The quantity of threshold displayed in the figures is for illustrative purposes only. There is no requirement for more than two thresholds for any elements.

At step 208, each threshold for a given element of a segment is assigned a quantifiable value. The quantifiable value may be calculated by processor 406 and/or received as an input, such as through input 418. In another embodiment, the value may be stored on Memory module 404. In certain embodiments, the value for at least one threshold of an element is determined from data stored in Assumptions 409. In one embodiment, the quantifiable value may be determined by a scaling factor. In one such embodiment, one specific element may have a threshold whose quantifiable value is first calculated, while one or more of the remaining thresholds specific to that element may be scaled according to a scaling factor based upon the calculated value. In one such embodiment, data from input 418 may provide data regarding a first threshold's quantifiable value that is processed by processor 406 to obtain a scaling factor from which a quantifiable value is calculated for a second threshold of that specific element. Different embodiments of the invention may utilize different scales from which one or more thresholds are adjusted by, including but not limited to: exponential, logarithmic, or any scale that may be determined by one or more algorithms. In another embodiment, at least one threshold, such as a third threshold may be determined according to the data regarding the first threshold and data obtained from Historical Data 410. Indeed, in certain embodiments, one or more thresholds are based, at least in part, upon data from Historical Data 410. Those skilled in the art will appreciate upon review of this disclosure that different scales may be applied to a single group of thresholds for an element. Furthermore, while the individual inputs (such as inputs 416, 418) of FIG. 4 are shown distinct and separate, this is for illustrative purposes only. In certain embodiments, a single input port may be utilized for receiving the data identified in relation to inputs. For example, in one embodiment a single CAT6 communications cable may be operatively connected to an RJ-45 connector to provide one or more inputs. Yet in other embodiments, one or more of the inputs is separate from at least another input.

At step 210, the quantity of thresholds exceeded by a received value corresponding to at least one element is determined Data transmitting the received value may be received from Communications Module 109 of Computing Device 101. Yet in other embodiments, data regarding the received value and/or the received value may be received from a remote computer, such as remote computing devices 141 and/or 151. In one such embodiment, a user may be presented with a display, such as a graphical user interface, that displays one or more elements of at least one segment. In one such embodiment, a display device may display an interface providing the content shown in FIG. 5, however, without the priority values 512-520 displayed. A user may then read a displayed element and determine which of a plurality of choices is correct. For simplicity purposes, each threshold among the plurality of thresholds 522 is notated with the letters A, B, C, D, and E, respectively. If a user chooses "C" among the plurality of thresholds 522, the user input may be transmitted to processor 103, indicating that thresholds "A" and "B" have been exceeded. While the exemplary embodiment shows exemplary elements relating to a risk segment, those skilled in the art will appreciate that the teachings apply to any segment of model 408.

While the above examples have been described in relation to a finance segment (FIG. 3) and a risk segment (FIG. 5), the inventors have also discovered that the utilization of a strategy segment provides excellent results. In one implementation, a plurality of elements are utilized in a strategy segment. FIG. 6 shows an exemplary Listing of elements 600 that may be used in a strategy segment according to one embodiment of the invention. As more thoroughly presented in the figure, element 602 relates to "Sustaining," such as typical recurring year over year activities to maintain current operational methodology and processes. Element 604 relates to "Cost Saves," or efforts at reducing the cost for a current operation or process by creating efficiencies in manual or systemic activities. Element 606 relates to "Competitive Advantage," such as the development of expanding markets/products to maintain or improve our position in the competitive landscape. Element 608 relates to "Infrastructure," such as the support, enablement or provision of existing processes or environment to those areas not at current foundational standards. Element 610 relates to "ROC (Revenue, Opportunities and Cost Savings)," such as tactical solutions and strategies directly aligned to a 5-year ROC. Element 612 relates to "Strategy-Technology."

At step 212, a score for at least one segment is calculated. In certain embodiments, processor 406 may be used to calculate a score for at least one segment of the model 408 by utilizing, at least in part, the quantifiable value for the quantity of thresholds exceeded and the prioritization value for each element. In one such embodiment, the priority score of a first element is multiplied by the quantifiable value correlating to the number of thresholds exceeded as indicated by a received user input for the first element to obtain an element score. This may be performed for each element of each segment. For example, the sum of all element scores for a segment may be calculated to obtain a segment score. At step 214, a project score may be calculated. In one embodiment, the project score is calculated by summing the segment scores. Those skilled in the art may realize that steps 212 and 214 may be done concurrently or independently. In certain embodiments, the processes shown in 212 and 214 may be done as a single step. In fact, there is no requirement that a segment score be explicitly calculated before determining the project score, rather in certain embodiments, the project score is calculated by determining the element score for each element of each segment and then calculating a project score without regard for which elements belonged to a specific segment of the model.

At step 216, two or more projects may be ranked based, at least in part, on the project score for each project. In one embodiment, ranking multiple projects allows decision makers to easily and readily determine which projects, either individually or taken collectively will achieve the enterprise's goals. Furthermore, as discussed throughout this disclosure, it is within the scope of various embodiments of the invention to consider updated goals of an enterprise, thus, step 202 may be reinitiated to ensure that the elements being provided coincide with the enterprise's most current goals. Further, while step 202 is shown as being reinitiated, those skilled in the art will understand, that any process (202-216) may continually be performed and that any output of any of the processes (202-216) may be utilized in a continual basis in any methods in accordance with various embodiments of the invention. In this regard, there is no requirement in certain embodiments that specific steps occur before the initiation or conclusion of any other step.

Another embodiment of the disclosure includes forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the disclosure is contemplated. For example, aspects of the method steps disclosed herein may be executed on a processor on a computing device 101. Such a processor may execute computer-executable instructions stored on a computer-readable medium.

Other aspects of the invention relate to graphical user interfaces that allow users to provide a user input into a model, such as model 408. In one embodiment, a graphical user interface ("GUI") may be displayed on a display device operatively connected to any of the computing devices shown in FIG. 1. In one embodiment, a method may be implemented to displaying information on a display device. In one embodiment, the display device may be connected to computer device 141 and/or computer device 151. In another embodiment, a computer-readable medium may comprise computer-executable instructions for displaying information on a display device. In accordance with such a computer-readable medium and/or method, implementation may include instructions for displaying several elements of at least one of a finance segment, a strategy segment, or a risk segment. In one embodiment, the display (or portion thereof) may resemble FIG. 3. As seen in FIG. 3, several elements relating to an exemplary finance segment are being displayed. As discussed in more detail below, other embodiments may provide information in addition to the elements, either simultaneously or separately.

In accordance with other embodiments, several thresholds may be displayed for each element of each segment displayed. In at least one embodiment, at least one threshold for an element is determined with the aid of historical data. The threshold may be displayed concurrently with the elements so as to allow a user to determine the most applicable threshold for a given element. In one embodiment, the display of one or more thresholds may resemble the thresholds provided in FIG. 5. As seen in FIG. 5, the thresholds are displayed substantially adjacent and parallel to the associated element. Those skilled in the art will appreciate that there is no requirement that each threshold for each element be simultaneously displayed. Rather, instructions may be implemented to receive a user input indicating the user is requesting to view another page of elements and their respective thresholds. Transfer of the user input may be by way of any mechanism known in the art, including the exemplary mechanisms provided in reference to FIG. 1.

The computer-readable medium may further include instructions that allow the reception of a user input indicative of the quantity of thresholds exceeded for the displayed elements. Upon receiving the user input, the indication may be stored in one or more computer-readable mediums that can be local, remote, or a combination thereof.

According to various aspects of the invention, the indication provided in the user input may be used by a processor to calculate a segment score. In one embodiment, one or more segment scores are determined by implementation of step 212 as described in relation to the exemplary method provided in FIG. 2. Further embodiments comprise instructions, that when executed, display a value indicative of a segment score for at least one of the finance segment, the strategy segment, or the risk segment. In one embodiment, the value indicative of a segment score may be displayed on another display device, and thus not displayed to the user that provided the user input indicative of the number of thresholds exceeded. For example, if the plurality of elements and thresholds were displayed on a display device connected to computer device 141, the value indicative of the segment score(s) may be shown on another display device, such as a display device operatively connected to computer device 151. Furthermore, in certain embodiments, the calculation and/or display of one or more segment scores may not be initiated until a user input is received. Such a user input may also originate from another computer device.

Further embodiments of the invention relate to graphical user interfaces that allow users to provide a user input regarding the priority values utilized in determining a segment score. As discussed above, a graphical user interface ("GUI") may be displayed on a display device operatively connected to any of the computing devices shown in FIG. 1. As discussed above in relation to the exemplary method provided in step 204 of FIG. 2, each element of each segment may be prioritized against each other element of the same segment according to a prioritization value. FIG. 7 shows an exemplary user interface that may be implemented in accordance with one or more embodiments of the invention. In one embodiment, the exemplary user interface may be utilized by management personal of a corporation (or a division of the corporation). For example, in one specific embodiment, management personal may utilize the user interface to enter one or more values indicative of the importance of specific elements and/or to provide a scale of importance for the elements. As seen in FIG. 7, a plurality of elements of at least one of a finance segment, a strategy segment, or a risk segment are displayed on a display device (see columns 714-724 which are described in more detail below). Each element of the segment(s) relates to a specific goal of an enterprise. The user interface may be displayed in a manner a plurality of columns and rows, each representing elements of one or more segment. In the exemplary interface which shows a strategy segment, the ordering of rows 702-712 mimics the ordering of columns 714-724. Each row will intersect each column and likewise, each column will intersect each row. For example, row 702 and column 714 both relate to the "Sustaining" element, while row 712 and column 724 both relate to the "Technology Strategy."

In one embodiment, a plurality of inputs may be received. As seen in FIG. 7, each input is indicative of a quantitative value comparing one element of the at least one segment against another element of the same segment. In the illustrated embodiment, a user input may be received in one or more of the intersections of a row and a column to prioritize the element represented in the row against the element represented in the column. As would be appreciated by those skilled in the art upon review of this disclosure, any ranking system may be utilized. In one embodiment, a quantitative system may be implemented where:

9—Indicates that the element listed in the row is much more important than the element provided in the column, for example, as indicated by intersection 726 of row 702 and column 716, which shows that in the exemplary segment the "Sustaining" element is much more important than the "Cost Saves" element;

3—Indicates that the element listed in the row is somewhat more important than the element provided in the column, for example, as indicated by intersection 728 of row 702 and column 724, which shows that in the exemplary segment the "Cost Saves" element is somewhat more important than the "Technology Strategy" element;

1—Indicates that the element listed in the row is about the same importance as the element provided in the column, for example, as indicated by intersection 730, which shows that in the exemplary segment the "Competitive Advantage" element is about the same importance as the "Technology Strategy" element;

0.3333—Indicates that the element listed in the column is somewhat more important than the element provided in the row, for example, as indicated by intersection 732 of column 720 and row 712, which shows that in the exemplary segment the "ROC" is somewhat more important than the "Technology Strategy" element; and 0.1111—Indicates that the element listed in the column is much more important than the element provided in the row, for example, as indicated by intersection 734 of column 720 and row 710, which shows that in the exemplary segment the "ROC" element is much more important than the "Infrastructure" element.

In one embodiment, a legend or key may be displayed. For example, legend 735 provides guidance to a user when viewing and/or imputing a value. In yet another embodiment, one or more of the inputs received are displayed on the display device.

For each element, the quantitative values may be summed and then the percentage of each quantitative value contributing to the sum may be calculated. In one embodiment, each column may be summed, such as shown by designation 736 so that each element's percentage may be calculated. For example, intersection 738 has a value of 0.36 because the value 9 in intersection 726 divided by 25 (the sum of column 716) is 0.36.

The elements may then be ranked against each other. In one embodiment, the sum of the percentages may then be summed to determine a rank for each element in the segment. As shown in row 740, the sum of the percentages in the row is 2.4832728, the highest value in Sum Column 742, therefore indicative that the "Sustaining" element is the highest ranked (most important) element in the segment. According to certain embodiments, the value provided in Sum Column 742 or a derivation of the value in Sum Column 742 may be utilized as the prioritization value. In another embodiment, a different quantitative system may be used and/or the rows may be summed and the percentage of each element's percentage may be calculated, so that the sums of the percentages may then be calculated to determine a rank for the elements in a segment.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method of calculating a segment score comprising:
    for a first enterprise having at least two divisions, each of the at least two divisions having different division goals, receiving a plurality of funding requests, wherein at least a first funding request originates from a first requestor at the first division and a second funding request originates from a second requestor at either the first or the second division, wherein the receiving of the first fund request comprises:
    (a) identifying a plurality of segments within the first division, the plurality of segments including at least a finance segment, a strategy segment and a risk segment, for at least one of: the finance segment, the strategy segment, or the risk segment, displaying a plurality of elements for review, wherein each segment relates to one or more goals of the enterprise, and each element is specific to that respective segment's one or more goals of the enterprise;
    (b) displaying a plurality of thresholds for each element of each segment displayed, wherein the thresholds are calculated from historical data of the enterprise;
    (c) receiving a user input from a user that is indicative of the quantity of thresholds exceeded for the displayed elements; and
    (d) calculating with a processor a value indicative of a segment score for at least one of the finance segment, the strategy segment, or the risk segment that is determined by the method comprising:
        (i) prioritizing, by the processor in a computing device without requiring additional user input, each element of each segment against each other element of the same segment according to a prioritization value;
        (ii) assigning, by the processor in the computing device without requiring additional user input, a quantifiable value to each of the thresholds for the elements;
        (iii) for each displayed element, determining, by the processor in the computing device without requiring additional user input, the quantity of thresholds exceeded by the value received by the user input;
        (iv) using the processor to calculate an element score for each displayed element by utilizing the received value and the prioritization value of the element; and
        (v) calculating by the processor the segment score from the individual elements within the segment.

2. The method of claim 1, wherein the prioritization value is determined by an analytic hierarchy process.

3. The method of claim 2, wherein the determination of the prioritization value comprises:
    (1) receiving a plurality of inputs, each input being indicative of a quantitative value comparing one element of the at least one segment against another element of the same segment;
    (2) performing (1) for each other element in the at least one segment;
    (3) displaying the quantitative values obtained in (2);
    (4) for each element, summing the displayed quantitative values and calculating the percentage of each quantitative value contributing to the sum; and
    (5) ranking the elements.

4. The method of claim 3, wherein the determination of the prioritization value comprises:
    (6) displaying the ranking of the elements.

5. The method of claim 3, wherein the plurality of inputs of (1) are selected from the group consisting of: a user input, an input generated from historical data, an assumption, and combinations thereof.

6. The method of claim 3, wherein the ranking is determined by summing all of the percentages for each element.

7. The method of claim 1, further comprising:
    (e) using a processor to calculate a project score
    (f) displaying the project score on a display device.

8. The method of claim 1, wherein quantifiable value for a first threshold within a plurality of thresholds for an element is calculated utilizing a scaling factor.

9. The method of claim 8, wherein the quantifiable value of a second threshold for the element is first calculated and the first quantifiable value is determined by scaling the quantifiable value of the second element by the scaling factor.

10. The method of claim 1, further comprising:
    (e) displaying a value indicative of a model score, wherein the model score is determined by utilizing a calculated segment score for each of the finance segment, the strategy segment, or the risk segment.

11. The method of claim 1, comprising:
(e) updating the thresholds of a first segment if the scoring of a second segment or an element of the second segment is above a certain value.

12. The method of claim 1, wherein the risk segment comprises elements relating to the risks selected from the group consisting of: Contractual Risk, Brand Image/Reputational Risk, Legal Risk, External Regulatory/Compliance Risk, Operational & Process Execution Risk, and combinations thereof.

13. The method of claim 1, wherein the finance segment comprises elements relating to the financial considerations selected from the group consisting of: net present value ("NPV") of shareholder value added ("SVA"), information regarding the return on investment ("ROI") for a specific project proposed for the enterprise, In Year Net Income Before Tax (NIBT), Payback, and combinations thereof.

14. The method of claim 1, wherein the strategy segment comprises elements relating to strategy considerations selected from the group consisting of: Sustaining, Cost Saves, Competitive Advantage, Infrastructure, ROC (Revenue, Opportunities and Cost Savings), and Technology.

15. A method comprising:
(a) identifying, by a computing device, a plurality of segments for a division of an enterprise, the plurality of segments including at least a finance segment, strategy segment and risk segment;
(b) displaying a plurality of elements of at least one of the finance segment, the strategy segment, or the risk segment, wherein each element relates to a specific goal of the enterprise;
(c) receiving a plurality of inputs, each input being indicative of a quantitative value comparing one element of the at least one segment against another element of the same segment;
(d) performing (c) for each other element in the at least one segment;
(e) displaying the quantitative values obtained in (c);
(f) for each element, summing the displayed quantitative values and calculating the percentage of each quantitative value contributing to the sum, by the processor of a computing device without requiring user input;
(g) ranking the elements, by the processor of the computing device without requiring user input; and
(h) displaying the ranking of the elements.

16. The method of claim 15, wherein the plurality of inputs are selected from the group consisting of: a user input, an input generated from historical data, an assumption, and combinations thereof.

17. The method of claim 16, wherein the ranking is determined by summing all of the percentages for each element.

18. The method of 16, further comprising:
(i) displaying a legend comprising values.

19. A non-transitory computer-readable medium comprising computer-executable instructions, that when executed perform the method comprising:
(a) identifying a plurality of segments for a division of an enterprise, the plurality of segments including at least a finance segment, strategy segment and risk segment;
(b) displaying a plurality of elements of at least one of the finance segment, the strategy segment, or the risk segment;
(c) displaying a plurality of thresholds for each element of each segment displayed, wherein the thresholds are calculated from historical data of the enterprise;
(d) receiving a user input from a user that is indicative of the quantity of thresholds exceeded for the displayed elements; and
(e) displaying a value indicative of a segment score for at least one of the finance segment, the strategy segment, or the risk segment that is determined by the method comprising:
(i) prioritizing each element of each segment against each other element of the same segment according to a prioritization value;
(ii) assigning a quantifiable value to each of the thresholds for the elements;
(iii) for each displayed element, determining the quantity of thresholds exceeded by the value received by the user input;
(iv) using a processor to use calculate an element score for at each displayed element by utilizing the received value and the prioritization value of the element; and
(v) calculating the segment score from the individual elements within the segment.

20. The computer-readable medium of claim 19, further comprising computer-executable instructions that when executed perform a method for determining a prioritization value comprising:
(f) displaying a plurality of elements of at least one of the finance segment, the strategy segment, or the risk segment, wherein each element relates to a specific goal of the enterprise;
(g) receiving a plurality of inputs selected from the group consisting of: a user input, an input generated from historical data, an assumption, and combinations thereof, each input being indicative of a quantitative value comparing one element of the at least one segment against another element of the same segment;
(h) performing (g) for each other element in the at least one segment;
(i) displaying the quantitative values obtained in (h);
(j) for each element, summing the displayed quantitative values and calculating the percentage of each quantitative value contributing to the sum;
(k) ranking the elements; and
(l) displaying the ranking of the elements.

* * * * *

UNITED STATES PATENT AND TRADEMARK OFFICE
CERTIFICATE OF CORRECTION

PATENT NO. : 8,650,108 B1
APPLICATION NO. : 12/181834
DATED : February 11, 2014
INVENTOR(S) : Dorene S. Schram et al.

Page 1 of 1

It is certified that error appears in the above-identified patent and that said Letters Patent is hereby corrected as shown below:

On the Title Page
Under item (75) Inventors, Line 4:
   Please delete "Phillips" and insert --Philipps--

In the Claims
In Column 14, Claim 7, Line 54:
   After "score", insert --;--

Signed and Sealed this
Twenty-first Day of July, 2015

Michelle K. Lee
*Director of the United States Patent and Trademark Office*